US008261523B2

(12) United States Patent
Patton

(10) Patent No.: US 8,261,523 B2
(45) Date of Patent: Sep. 11, 2012

(54) CLIP CONTROL SYSTEM FOR WALK REEL MOWER

(75) Inventor: Robert D. Patton, New Prague, MN (US)

(73) Assignee: The Toro Company, Bloomington, MN (US)

( * ) Notice: Subject to any disclaimer, the term of this patent is extended or adjusted under 35 U.S.C. 154(b) by 2 days.

(21) Appl. No.: 13/016,133

(22) Filed: Jan. 28, 2011

(65) Prior Publication Data

US 2011/0185691 A1    Aug. 4, 2011

Related U.S. Application Data

(60) Provisional application No. 61/301,448, filed on Feb. 4, 2010.

(51) Int. Cl.
*A01D 34/53* (2006.01)
(52) U.S. Cl. .............................. 56/249; 56/13.5; 56/17.2
(58) Field of Classification Search .................... 56/249, 56/294, 10.2 H, 10.2 R, 13.5, 11.9, 15.9, 56/17.2; 74/15.86
See application file for complete search history.

(56) References Cited

U.S. PATENT DOCUMENTS

| | | | |
|---|---|---|---|
| 2,253,899 A | 8/1941 | Duemler | |
| 2,378,488 A | 6/1945 | Loewe et al. | |
| 2,501,163 A * | 3/1950 | Dowler | 56/252 |
| 2,859,580 A * | 11/1958 | Salamy | 56/11.8 |
| 2,909,882 A * | 10/1959 | Lewis | 56/7 |
| 3,461,656 A * | 8/1969 | Van Ausdall | 56/249 |
| 3,546,951 A * | 12/1970 | Van Ausdall | 74/15.86 |
| 3,566,590 A * | 3/1971 | Van Ausdall | 56/15.9 |
| 3,668,847 A * | 6/1972 | Van Ausdall | 56/252 |
| 5,430,997 A * | 7/1995 | O'Halloran et al. | 56/6 |
| 6,622,464 B2 * | 9/2003 | Goman et al. | 56/16.9 |
| 6,758,030 B2 * | 7/2004 | Dettmann | 56/11.9 |
| 7,191,584 B2 * | 3/2007 | Goman et al. | 56/249 |
| 7,395,652 B2 * | 7/2008 | Goman et al. | 56/249 |
| 7,647,756 B2 * | 1/2010 | Rinholm et al. | 56/249 |
| 7,647,757 B2 * | 1/2010 | Rinholm et al. | 56/249 |
| 7,748,204 B2 * | 7/2010 | Goman et al. | 56/249 |
| 7,788,892 B2 * | 9/2010 | Schmidt et al. | 56/249 |
| 7,805,918 B2 * | 10/2010 | Silbernagel et al. | 56/249 |
| 7,954,308 B2 * | 6/2011 | Harris | 56/10.2 H |
| 2006/0090439 A1 * | 5/2006 | Anderson et al. | 56/10.2 G |

FOREIGN PATENT DOCUMENTS

GB          579261          7/1946

* cited by examiner

*Primary Examiner* — Arpad Fabian-Kovacs
(74) *Attorney, Agent, or Firm* — James W. Miller

(57) ABSTRACT

A reel cutting unit of a reel mower is provided with a belt and pulley drive system for rotating the reel of the cutting unit at variable speeds when the ground speed of the reel cutting unit is substantially constant to provide different clips. The drive system has three pulleys of different diameter in engagement with the belt in drive, driven and idler positions. The pulleys can be interchangeably used in any of the positions by moving the pulleys around into the different positions in six different possible arrangements. The pulleys are selectively placed in one arrangement at a time to select the clip provided by that arrangement. A chain and sprocket drive system with different diameter sprockets may be used in place of the belt and pulley drive system. The belt and pulley drive system may comprise toothed pulleys and toothed timing belt.

8 Claims, 1 Drawing Sheet

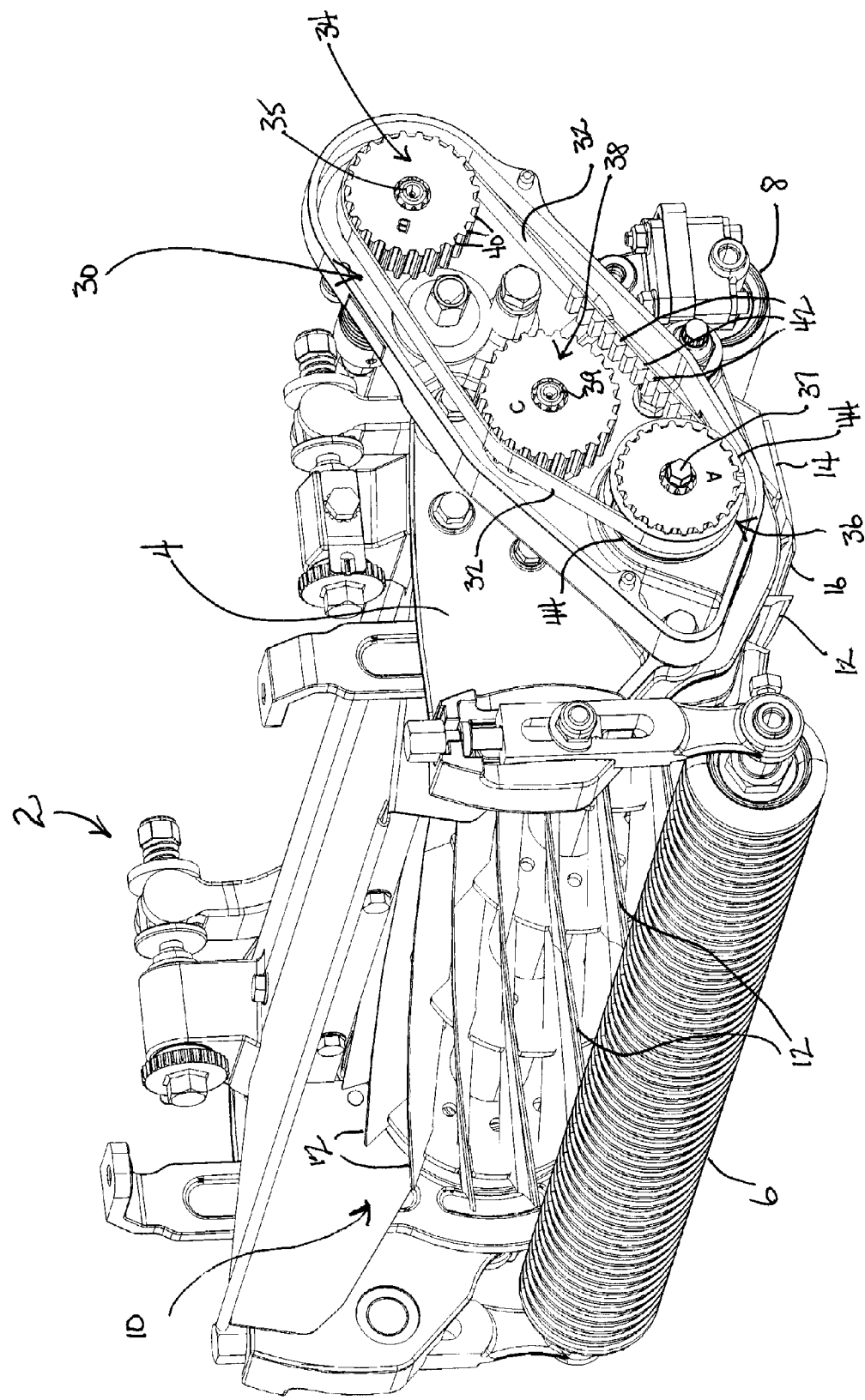

CLIP CONTROL SYSTEM FOR WALK REEL MOWER

CROSS REFERENCE TO RELATED APPLICATIONS

This application claims the benefit of one or more previously filed copending provisional applications identified as follows: Application Ser. No. 61/301,448 filed Feb. 4, 2010.

TECHNICAL FIELD

This invention relates to a walk reel mower that cuts grass while traveling over the ground at a substantially constant mowing speed. More particularly, this invention relates to a system and method for conveniently controlling and changing the clip of the mower.

BACKGROUND OF THE INVENTION

The term "clip" in the mowing art refers to a characteristic of the operation of a reel cutting unit, namely the amount of forward travel of cutting unit 2 in the time interval determined by the length of time that it takes for successive blades on the cutting reel to contact a predetermined reference spot on the bedknife. The cutting reel has a number of helically twisted blades spaced about its circumference. As the cutting reel rotates at a substantially constant speed, any particular cutting blade will contact a reference spot on the bedknife at a predetermined time $t_1$ with the point of contact sliding along the bedknife due to the helical twist in the blade. The next successive cutting blade on reel 10 will contact the same reference spot on the bedknife at some later point in time $t_2$, and this process will be repeated over and over again with each successive blade. The clip is the amount the mower has moved forwardly in the time interval $t_2-t_1$.

In a walk reel mower, the ground speed of the mower as produced by the traction drive is usually a constant while mowing. Reel 10 is also driven at a constant speed while mowing to produce a consistent quality of cut. The clip is therefor determined by how fast reel 10 is rotating relative to the ground speed of the mower as well as by how many blades are carried on reel 10, whether it is an 8 bladed, 11 bladed, or 14 bladed reel, for example.

In known walk reel mowers previously manufactured and sold by The Toro Company, the assignee of this invention, reel 10 is driven by a toothed timing belt from an input shaft that mounts a toothed drive pulley. A toothed driven pulley is operatively connected to the shaft of reel 10. As the input shaft turns at a substantially constant rotational speed, the timing belt drives the driven pulley, and thus reel 10, at a driven speed that is determined by the various numbers of teeth, and thus the pitch diameters, of the drive pulley and the driven pulley. For a reel with a given number of blades, the driven speed of reel 10 is, as noted earlier, determinative of the clip for a walk reel mower that is traveling at a constant ground speed during mowing.

In this known timing belt, toothed drive pulley, and toothed driven pulley system, Toro has previously provided the user of the mower with two different toothed drive pulleys having different numbers of teeth. The user can selectively change the clip, and thus achieve a slightly different quality of cut, by replacing one drive pulley with the other alternatively usable drive pulley. However, this provides a very limited number of different clips, namely two depending upon which of the different drive pulleys is in place. Moreover, the user has to keep the different drive pulleys on hand and available in order to change the clip. If one of the alternately usable drive pulleys is lost or can't be found, the clip can't be changed.

SUMMARY OF THE INVENTION

One aspect of this invention relates to a reel cutting unit which comprises a reel having a plurality of transversely extending blades that are spaced apart around a circumference of the reel, the reel being rotatable about a substantially horizontal axis. A bedknife is located adjacent the reel and is cooperable with the reel to cut grass as the blades of the reel sweeps uncut grass against a cutting edge on the bedknife. The rotation of the reel produces a clip that comprises a forward distance of travel of the cutting unit in a time interval determined by the length of time that it takes for successive blades on the reel to contact a predetermined reference spot on the bedknife. A clip control and selection system is provided for selecting one of a predetermined number of different possible clips when the reel cutting unit is propelled over the ground at a substantially constant ground speed. The clip control and selection system comprises a drive shaft, a driven shaft, and an idler shaft that mount, respectively, a circular drive member, a circular driven member, and a circular idler member, each of the circular members having a different diameter from the other circular members. A flexible and endless transmission member is entrained around the drive and driven members to transfer rotation of the drive shaft to the driven shaft with the driven shaft being operatively connected to the reel to rotate the reel. The idler member also engages with the endless transmission member. The drive, driven and idler shafts are sufficiently similar in outside diameter to one another, and the drive, driven and idler members have mounting bores that are sufficiently similar in inside diameter to one another, that any of the drive, driven and idler members can be interchangeably mounted at any given time on any of the drive, driven and idler shafts to provide six different possible clips, or drive ratios, for selection by a user for a given constant rotational input speed of the drive shaft.

Another aspect of this invention relates to a method of controlling and selecting clip in a reel cutting unit having a reel with a plurality of circumferentially spaced blades that are cooperable with a bedknife to cut grass therebetween, the clip comprising a forward distance of travel of the reel cutting unit over the ground in a time interval determined by the length of time that it takes for successive blades on the reel to contact a predetermined reference spot on the bedknife. The method comprises providing a drive system for rotating the reel, wherein the drive system comprises a flexible endless transmission member and first, second and third circular members arranged in drive, driven and idler positions in engagement with the flexible transmission member, the circular member in the drive position being operatively connected to an input drive shaft and the circular member in the driven position being operatively connected to the reel for rotating the reel. The first, second and third circular members have different diameters from one another and may be interchangeably used in any of the drive, driven and idler positions to provide six different possible clips, or drive ratios, when arranged in six different arrangements as follows: 1.) a first arrangement in which the first circular member is in the drive position, the second circular member is in the driven position, and the third circular member is in the idler position, 2.) a second arrangement in which the first circular member is in the drive position, the third circular member is in the driven position, and the second circular member is in the idler position, 3.) a third arrangement in which the second circular member is in the drive position, the first circular member is in the driven position, and the third circular member is in the idler position, 4.) a fourth arrangement in which the second circular member is in the drive position, the third circular member is in the driven position, and the first circular member is in the idler position, 5.) a fifth arrangement in which the third circular member is in the drive position, the first circular member is in the driven position, and the second circular member is in the idler position, and 6.) a sixth arrangement in which the third circular member is in the drive position, the second circular member is in the driven position, and the first circular member is in the idler position. The method further comprises selecting and arranging the first, second and third circular members in one of the six different arrangements to select the clip that is provided by the one selected arrangement and then conducting a grass mowing operation while propelling the reel cutting unit over the ground at a substantially constant ground speed and while rotating the input drive shaft at a substantially constant rotational speed.

BRIEF DESCRIPTION OF THE DRAWINGS

This invention will be described more completely in the following Detailed Description, when taken in conjunction with the following drawings, in which like reference numerals refer to like elements throughout.

FIG. 1 is a perspective view of a portion of a reel cutting unit with a portion of reel 10 cutting unit having been broken away, particularly illustrating the clip control and selection system of this invention.

DETAILED DESCRIPTION

Referring first to FIG. 1, an improved reel cutting unit of this invention is generally as 2. Cutting unit 2 includes a cutting unit frame 4 that is supported for rolling over the ground by a grooved front roller 6 and a smooth rear roller 8. Cutting unit 2 includes a transversely extending reel 10 having a number of transversely extending, helically twisted blades 12 circumferentially spaced around the circumference of reel 10. Blades 12 cooperate with a fixed bedknife 14 on cutting unit frame 4. During the rotation of reel 10 about its horizontal axis of rotation, the successive blades 12 on reel 10 sweep the standing and uncut grass against a sharpened front cutting edge 16 of bedknife 14 to sever the grass in a shearing type action.

U.S. Pat. No. 6,622,464 is assigned to The Toro Company, the assignee of this invention, and is hereby incorporated by reference. The 464 patent discloses a walk reel mower of the type on which cutting unit 2 shown in FIG. 1 may be mounted and used. When so the mounted, cutting unit frame 4 is suitably attached to the traction frame of the walk reel mower to be carried thereby for movement over the ground. A power source on the traction frame, i.e. an internal combustion engine, electric motor, or the like, is provided for propelling the traction frame of the mower over the ground.

Typically, in a walk reel mower of the type shown in the 464 patent, reel mower has a traction drive that propels either drive wheels or a drive roller on the mower to provide the mower with at a substantially constant ground speed when mowing. The operator can select or change the ground speed at which he or she wishes to mow by choosing either a faster or slower ground speed according to his or her preference. This can be done in many ways, e.g. by selecting one gear from a number of gears in a mechanical, variable speed, gear type transmission that is powered by the internal combustion engine or by establishing and maintaining through a control a set speed of rotation of the output shaft of an electric motor. Thus, as the operator walks behind the reel mower during mowing, whatever ground speed has been selected for use by the operator is held substantially constant by the traction drive.

In addition, the power source is also operatively coupled in some fashion to the shaft of reel 10 for rotating reel 10. This can also be done in different ways. For example, this can be done by using the output shaft of a single electric motor to power both the traction drive of the mower as well as the reel or by using two different output shafts of two different electric motors to independently power the traction drive and the reel. The walk reel mower is operated by an operator who walks behind the traction frame and guides and manipulates the walk reel mower using an upwardly and rearwardly extending handle assembly. The 464 patent may be referred to for further details of the walk reel mower.

One embodiment of a clip control and selection system according to this invention is disclosed in FIG. 1 as 30. Clip control system 30 comprises a toothed timing belt 32 that is entrained around three toothed pulleys 34, 36 and 38. These pulleys include:

a drive pulley 34 that is mounted on a drive shaft 35 with drive shaft 35 being rotated at a substantially constant rotational speed during mowing by a drive train (not shown) that is ultimately powered by the power source of the walk reel mower;

a driven pulley 36 that is operatively coupled to a driven shaft, i.e. to the shaft 37 of reel 10, to rotate reel 10 when drive pulley 34 is rotated to drive timing belt 32; and an idler pulley 38 rotatably mounted on an idler stub shaft 39 with idler pulley 38 engaging and supporting timing belt 32 between drive and driven pulleys 34 and 36.

Clip control system 30 is visible in FIG. 1 because a belt cover has been removed from cutting unit 2 in FIG. 1 to illustrate belt 32 and pulleys 34, 36 and 38.

All of the pulleys 34, 36 and 38 have teeth 40 with the same pitch as the teeth 42 on timing belt 32 to allow the pulley teeth 40 to mesh with timing belt teeth 42 in a known manner. One or more of the pulleys can carry side flanges to help keep timing belt 32 in lateral registration on the pulleys. For example, driven pulley 36 shown in FIG. 1 has left and right side flanges 44 for this purpose.

Each of the three pulleys shown in FIG. 1 have different numbers of teeth 40 thereon which dictate that each of the three pulleys have different pitch diameters, i.e. a pulley with more teeth 40 will necessarily have a larger pitch diameter than a pulley with fewer teeth 40 since the pitch of the teeth are identical to match the pitch of the teeth 42 on timing belt 32. Thus, for example, as shown in FIG. 1, drive pulley 34 has 24 teeth, driven pulley 36 has 22 teeth, and idler pulley 38 has 25 teeth. However, as will be clear momentarily herein, the terms "drive pulley", "driven pulley" and "idler pulley" are not limited to pulleys with a particular number of teeth, but will refer herein to any pulley, regardless of the number of teeth on that pulley, which occupies the drive, driven and idler positions relative to timing belt 32 as shown in FIG. 1. Thus, drive pulley 34 will be any pulley that is coupled to drive shaft 35, driven pulley 36 will be any pulley that is coupled to shaft 37 of reel 10, and idler pulley 38 will be any pulley in the intermediate idler position on stub shaft 39. It just so happens that as currently depicted in FIG. 1, drive pulley 34 is a pulley with 24 teeth, driven pulley 36 has 22 teeth, and idler pulley 38 has 25 teeth.

Again taking the example of FIG. 1, when drive pulley 34 has 24 teeth and driven pulley 36 has 22 teeth as shown in FIG. 1, this 24 tooth drive pulley/22 tooth driven pulley set up produces a first clip value—i.e. the mower will move forward by a first predetermined distance in the time interval $t_2-t_1$ identified in the Background of the Invention section. A second clip value can be easily derived in FIG. 1 by switching the driven and idler pulleys so that driven pulley 36 is now the pulley with 25 teeth and idler pulley 38 is now the pulley with 22 teeth. This reconfigured 24 tooth drive pulley/25 tooth driven pulley set up produces a second clip value—i.e. the mower will move forward by a second predetermined distance in the time interval $t_2-t_1$ with the second distance being different than the first distance. In this respect, the reader hereof should remember that the ground speed of the mower as provided by the traction drive remains a constant, but the time interval $t_2-t_1$ is different in the second instance so the mower travels a different distance in that different time interval $t_2-t_1$, leading to the new and different second clip value. Accordingly, with the 24 tooth pulley in place as drive pulley 34, two clip values can be obtained depending upon which of the remaining two pulleys is installed as driven pulley 36 and which is installed as idler pulley 38. Note that the number of teeth on idler pulley 38 has no influence on the clip as the clip is determined solely by the numbers of teeth on the drive and driven pulleys 34 and 36.

Now, it is also possible to uninstall the 24 tooth pulley as drive pulley 34 and put in place as drive pulley 34 either of the other pulleys, namely either the pulley with 22 teeth or the pulley with 25 teeth. When either such pulley is installed as drive pulley 34, then two additional clip values can be obtained by using the remaining two pulleys alternately as driven pulley 36 and as idler pulley 38. Thus, the following additional pulley set ups will produce four additional clip values that are distinct from each other and from the first two clip values:
- a 25 tooth drive pulley/24 tooth driven pulley set up that will produce a third clip value;
- a 25 tooth drive pulley/22 tooth driven pulley set up that will produce a fourth clip value;
- a 22 tooth drive pulley/24 tooth driven pulley that will produce a fifth clip value; and
- a 22 tooth drive pulley/25 tooth driven pulley that will produce a sixth clip value.

The following chart summarizes the different clips that occur on a 14 bladed reel 10 when the mower has a ground speed during mowing of 3.4 mph and the drive shaft is rotating at a substantially constant speed of 1980 rpm during mowing. Note that reels 10 with different numbers of blades will produce a similar clip chart but that the clip values will be different.

| Drive Pulley 34 | Driven Pulley 36 | Idler Pulley 38 | Clip in inches |
|---|---|---|---|
| 24 tooth | 25 tooth | 22 tooth | 0.135 |
| 24 tooth | 22 tooth | 25 tooth | 0.119 |
| 25 tooth | 24 tooth | 22 tooth | 0.124 |
| 25 tooth | 22 tooth | 24 tooth | 0.114 |
| 22 tooth | 24 tooth | 25 tooth | 0.141 |
| 22 tooth | 25 tooth | 24 tooth | 0.147 |

Arranging the clip values in numerical order, from smallest to largest, one can see the following:

| Clip in inches | Incremental Step Difference |
|---|---|
| 0.114 | |
| 0.119 | 0.005 |
| 0.124 | 0.005 |
| 0.135 | 0.011 |
| 0.141 | 0.006 |
| 0.147 | 0.006 |

Desirably, the numbers of teeth on the various pulleys are chosen so that the incremental differences between the various clips that are obtainable are as equal as possible. While perfection is not possible, in the example shown above, each clip varies from the one before it by about the same amount, i.e. namely by either 5 thousandths or 6 thousandths of an inch except for the difference between the third and fourth clips where the differential is 11 thousandths of an inch.

Clip control system 30 of this invention allows the operator to easily and quickly change clips simply by moving the various pulleys around between the different drive, driven and idler positions much in the nature of the movement of the cups in a shell game. In this respect, it is obvious that drive shaft 35, driven shaft 37 and idler shaft 39 have similarly sized outside diameters and the bores of pulleys 34, 36 and 38 have similarly sized inside diameters to allow pulleys 34, 36 and 38 to be mounted on any of the shafts 35, 37 and 39 and used in any of the drive, idler or driven positions. All of the pulleys 34, 36, and 38 are contained on cutting unit 2 and are always available to the operator. The operator need not go find a pulley somewhere in the shop or risk losing a pulley. Instead, all of the pulleys 34, 36 and 38 are located within the peripheral profile of timing belt 32.

In order to help the operator select a particular clip, pulleys 34, 36 and 38 will bear some sort of markings or indicia to identify each pulley separately from the others. In addition, a chart or visual guide will be available to the operator, perhaps by placing the chart on the inside of the belt cover that must be removed to gain access to the clip control system 30, that will identify the various locations of each of the marked pulleys to provide a particular clip. For example, the chart would be much like the first table above and the different pulleys could be marked A, B, and C as shown in FIG. 1 with pulley A being the 22 tooth pulley, pulley B being the 24 tooth pulley, and pulley C being the 25 tooth pulley. If the operator wanted the 0.135 inch clip, the chart would inform him that pulley B (the 24 tooth pulley) should be installed as the drive pulley, that pulley C (the 25 tooth pulley) should be installed as the driven pulley, and that pulley A (the 22 tooth pulley) should be installed as the idler pulley.

Various modifications of this invention will be apparent to those skilled in the art. For example, a chain and toothed sprockets could be used instead of a timing belt and toothed pulleys. In addition, timing belts and chains could be replaced by traditional V-belts and simple V-grooved pulleys without any teeth as long as the three different pulleys have different diameters. Accordingly, the scope of this invention is to be limited only by the appended claims.

I claim:
1. A reel cutting unit, which comprises:
   (a) a reel having a plurality of transversely extending blades that are spaced apart around a circumference of the reel, the reel being rotatable about a substantially horizontal axis;
   (b) a bedknife that is located adjacent the reel and that is cooperable with the reel to cut grass as the blades of the reel sweeps uncut grass against a cutting edge on the bedknife, wherein the rotation of the reel produces a clip that comprises a forward distance of travel of the cutting unit in a time interval determined by the length of time that it takes for successive blades on the reel to contact a predetermined reference spot on the bedknife;

(c) a clip control and selection system for selecting one of a predetermined number of different possible clips when the reel cutting unit is propelled over the ground at a substantially constant ground speed, which comprises:
  (i) a drive shaft, a driven shaft, and an idler shaft that mount, respectively, a circular drive member, a circular driven member, and a circular idler member, each of the circular members having a different diameter from the other circular members;
  (ii) a flexible and endless transmission member entrained around the drive and driven members to transfer rotation of the drive shaft to the driven shaft with the driven shaft being operatively connected to the reel to rotate the reel, the idler member also engaging with the endless transmission member; and
  (iii) wherein the drive, driven and idler shafts are sufficiently similar in outside diameter to one another, and the drive, driven and idler members have mounting bores that are sufficiently similar in inside diameter to one another, that any of the drive, driven and idler members can be interchangeably mounted at any given time on any of the drive, driven and idler shafts to provide six different possible clips for selection by a user for a given constant rotational input speed of the drive shaft.

2. The reel cutting unit of claim 1, wherein the idler member engages against an interior of one run of the endless transmission member such that all the drive, driven and idler members are located inside a peripheral profile of the endless transmission member.

3. The reel cutting unit of claim 1, wherein the drive, driven and idler members comprise toothed pulleys or sprockets and the endless transmission member comprises a toothed timing belt or chain, respectively, and wherein the diameters of the drive, driven and idler toothed pulleys or sprockets are sufficiently different from one another that each of the drive, driven and idler toothed pulleys or sprockets have a different number of teeth from the other toothed pulleys or sprockets.

4. The reel cutting unit of claim 3, wherein the six different possible clips provide five incremental step differences with a step difference representing the change between one clip and a next longer clip, and wherein the different numbers of teeth are chosen such that the incremental step differences are substantially equal for a majority of the five incremental step differences.

5. The reel cutting unit of claim 4, wherein the different numbers of teeth are chosen such that the incremental step differences are substantially equal for four of the five incremental step differences.

6. The reel cutting unit of claim 1, wherein each of the drive, driven and idler members contains identifying indicia that allows the members to be distinguished from one another.

7. A method of controlling and selecting clip in a reel cutting unit having a reel with a plurality of circumferentially spaced blades that are cooperable with a bedknife to cut grass therebetween, the clip comprising a forward distance of travel of the reel cutting unit over the ground in a time interval determined by the length of time that it takes for successive blades on the reel to contact a predetermined reference spot on the bedknife, which comprises:

(a) providing a drive system for rotating the reel, wherein the drive system comprises:
  (i) a flexible endless transmission member; and
  (ii) first, second and third circular members arranged in drive, driven and idler positions in engagement with the flexible transmission member, the circular member in the drive position being operatively connected to an input drive shaft and the circular member in the driven position being operatively connected to the reel for rotating the reel, wherein the first, second and third circular members have different diameters from one another and may be interchangeably used in any of the drive, driven and idler positions to provide six different possible clips when arranged in six different arrangements as follows:
    (1) a first arrangement in which the first circular member is in the drive position, the second circular member is in the driven position, and the third circular member is in the idler position;
    (2) a second arrangement in which the first circular member is in the drive position, the third circular member is in the driven position, and the second circular member is in the idler position;
    (3) a third arrangement in which the second circular member is in the drive position, the first circular member is in the driven position, and the third circular member is in the idler position;
    (4) a fourth arrangement in which the second circular member is in the drive position, the third circular member is in the driven position, and the first circular member is in the idler position;
    (5) a fifth arrangement in which the third circular member is in the drive position, the first circular member is in the driven position, and the second circular member is in the idler position; and
    (6) a sixth arrangement in which the third circular member is in the drive position, the second circular member is in the driven position, and the first circular member is in the idler position;

(b) selecting and arranging the first, second and third circular members in one of the six different arrangements to select the clip that is provided by the one selected arrangement; and (c) conducting a grass mowing operation while propelling the reel cutting unit over the ground at a substantially constant ground speed and while rotating the input drive shaft at a substantially constant rotational speed.

8. The method of claim 7, wherein the first, second and third circular members comprise toothed pulleys or sprockets and the endless transmission member comprises a toothed timing belt or chain, respectively, and wherein the diameters of the toothed pulleys or sprockets are sufficiently different from one another that each of the toothed pulleys or sprockets have a different number of teeth from the other toothed pulleys or sprockets.

* * * * *